United States Patent
Otsuki et al.

(10) Patent No.: US 12,553,802 B2
(45) Date of Patent: Feb. 17, 2026

(54) MEASUREMENT METHOD, AND BRAKE DUST MEASUREMENT PROGRAM INSTRUCTIONS

(71) Applicants: HORIBA, LTD., Kyoto (JP); HORIBA Europe GmbH, Darmstadt (DE)

(72) Inventors: Yoshinori Otsuki, Darmstadt (DE); Joel Danzer, Darmstadt (DE); Dmytro Lugovyy, Darmstadt (DE)

(73) Assignee: HORIBA. LTD. (JP)

( * ) Notice: Subject to any disclaimer, the term of this patent is extended or adjusted under 35 U.S.C. 154(b) by 295 days.

(21) Appl. No.: 18/257,279

(22) PCT Filed: Nov. 12, 2021

(86) PCT No.: PCT/JP2021/041716
§ 371 (c)(1),
(2) Date: Jun. 13, 2023

(87) PCT Pub. No.: WO2022/130853
PCT Pub. Date: Jun. 23, 2022

(65) Prior Publication Data
US 2024/0035934 A1 Feb. 1, 2024

(30) Foreign Application Priority Data
Dec. 14, 2020 (JP) ................... 2020-206612

(51) Int. Cl.
*G01N 1/24* (2006.01)
*G01N 1/22* (2006.01)
*G01N 15/06* (2024.01)

(52) U.S. Cl.
CPC ....... *G01N 1/24* (2013.01); *G01N 2001/2223* (2013.01); *G01N 15/06* (2013.01); *G01N 15/0618* (2013.01); *G01N 15/0656* (2013.01)

(58) Field of Classification Search
CPC ............ G01N 1/24; G01N 2001/2223; G01N 1/2202; G01N 15/06; G01N 15/0618; G01N 15/0656
(Continued)

(56) References Cited

U.S. PATENT DOCUMENTS 6,592,642 B2 * 7/2003 Maricq .................... B03C 3/47
96/1
11,543,331 B2 * 1/2023 Tsurumi ............... G01N 1/2226
(Continued)

FOREIGN PATENT DOCUMENTS

AT     527039 B1 * 10/2024 ............. B60T 17/22
CN     205503836 U * 8/2016
(Continued)

OTHER PUBLICATIONS iijima et al., Particle size and composition distribution analysis of automotive brake abrasion dusts for the evaluation of antimony sources of airborne particulate matter, Atmospheric Environment vol. 41, Issue 23, Jul. 2007, pp. 4908-4919 (Year: 2007).*
(Continued)

*Primary Examiner* — Stephanie E Bloss
*Assistant Examiner* — Kevin C Butler
(74) *Attorney, Agent, or Firm* — Brooks Kushman P.C.

(57) ABSTRACT

In order to make it possible to measure a brake dust amount and the like even when a main flow rate is fluctuated, a brake dust measurement device that measures brake dust generated from a brake includes: a main flow path through which a sample gas containing the brake dust flows; a sampling flow path that is connected to a sampling point set in the main flow path and collects a part of the sample gas; and a flow rate control mechanism that controls a sampling flow rate that is a flow rate in the sampling flow path such that the
(Continued)

sampling flow rate coincides with a flow rate proportional to a main flow rate that is a flow rate in the main flow path.

12 Claims, 7 Drawing Sheets

(58) Field of Classification Search
USPC .................................................. 73/28.01
See application file for complete search history.

(56) References Cited

U.S. PATENT DOCUMENTS

| | | | | |
|---|---|---|---|---|
| 2002/0166311 | A1* | 11/2002 | Maricq | ............... B03C 1/23 55/385.3 |
| 2010/0163119 | A1* | 7/2010 | Isobe | ............... G05D 7/0635 73/861.351 |
| 2017/0212030 | A1* | 7/2017 | Hasegawa | ............ G01N 15/06 |
| 2018/0172561 | A1* | 6/2018 | Kocher | ............... G01N 1/2273 |
| 2021/0199544 | A1* | 7/2021 | Tsurumi | ............... G01N 1/22 |

FOREIGN PATENT DOCUMENTS

| | | | | | |
|---|---|---|---|---|---|
| CN | 111024571 | A | * | 4/2020 | ......... G01N 15/0618 |
| CN | 120396918 | A | * | 8/2025 | ......... F16D 65/0031 |
| DE | 102017109356 | A1 | * | 11/2018 | ............. B60T 17/22 |
| DE | 102019218638 | B3 | * | 3/2021 | ............. B60T 17/22 |
| EP | 1256739 | A2 | * | 11/2002 | ............. B03C 3/743 |
| EP | 3627126 | A1 | * | 3/2020 | ............. G01L 5/288 |
| EP | 3798603 | A1 | * | 3/2021 | ............. G01N 1/02 |
| EP | 4578750 | A1 | * | 7/2025 | ............. B60T 17/22 |
| JP | 55-040393 | U | | 3/1980 | |
| JP | S5922516 | Y2 | * | 7/1984 | |
| JP | 2017161346 | A | * | 9/2017 | |
| JP | 2019108812 | A | * | 7/2019 | |
| JP | 2020520448 | A | * | 7/2020 | ............. G01N 15/02 |
| JP | 2022546361 | A | * | 11/2022 | ............. G01N 1/24 |
| JP | 7296375 | B2 | * | 6/2023 | ............. G01N 3/56 |
| KR | 20230115173 | A | * | 8/2023 | ......... F16D 65/0031 |
| WO | WO2019/225443 | A | | 11/2019 | |
| WO | WO-2019225443 | A1 | * | 11/2019 | ............. G01N 3/56 |
| WO | WO-2024262051 | A1 | * | 12/2024 | ............. G01N 1/02 |

OTHER PUBLICATIONS

Sanders, G. Paul et al., Airborne Brake Wear Debris: Size Distributions, Composition, and a comparison of Dynamometer and Vehicle Tests, Environmental Science & Technology, 2003, 37, 18, 4060-4069 (Year: 2003).*

International Search Report dated Jan. 18, 2022 issued for International application No. PCT/JP2021/041716.

* cited by examiner

MEASUREMENT METHOD, AND BRAKE DUST MEASUREMENT PROGRAM INSTRUCTIONS

CROSS-REFERENCE TO RELATED APPLICATIONS

This application is the U.S. national phase of PCT Application No. PCT/JP2021/041716, filed Nov. 12, 2021, which claims priority to Japanese Patent Application No. 2020-206612, filed Dec. 14, 2020, the disclosures of which are incorporated in their entirety by reference herein.

TECHNICAL FIELD

The present invention relates to a brake dust measurement device, a brake dust measurement method, and a brake dust measurement program

BACKGROUND ART

In a conventional brake dust measurement device, as shown in Patent Literature 1, a brake disposed in a chamber is operated while air is blown against the brake, and brake dust generated during this time is corrected to measure, for example, an amount of the brake dust. Specifically, in this measurement device, a sampling flow path for collecting a part of air containing brake dust is connected to a main flow path through which the air flows.

In such a measuring device, in order to correctly evaluate a brake dust amount and the like, it is preferable to make a flow velocity of the air blown to the brake constant. For that purpose, an aspect can be considered in which a flow rate in the main flow path (hereinafter, referred to as a main flow rate) is controlled such that the flow velocity of the air blowing against the brake is constant.

However, when the main flow rate is changed, there occurs a fluctuation in the ratio between the sampling flow rate collected into the sampling flow path and the main flow rate fluctuates, and the brake dust amount and the like cannot be accurately obtained.

CITATION LIST

Patent Literature

Patent Literature 1: JP 2020-520448 A

SUMMARY OF THE INVENTION

Technical Problem

A main object of the present invention is to enable more accurate measurement of a brake dust amount and the like than before.

Solution to Problem

A brake dust measurement device according to the present invention is a brake dust measurement device that measures brake dust generated from a brake, and the brake dust measurement device includes: a main flow path through which a sample gas containing the brake dust flows; a sampling flow path that is connected to a sampling point set in the main flow path and collects a part of the sample gas; and a flow rate control mechanism that controls a sampling flow rate that is a flow rate in the sampling flow path such that the sampling flow rate coincides with a flow rate proportional to a main flow rate that is a flow rate in the main flow path.

The brake dust measurement device configured as described above controls the sampling flow rate such that the sampling flow rate coincides with a flow rate proportional to the main flow rate; therefore, it is possible to accurately measure a brake dust amount and the like even when the main flow rate is fluctuated.

The main flow rate is preferably set using at least one of a temperature or pressure of a housing space in which the brake is housed.

This aspect can set the main flow rate in consideration of a flow velocity of air or the like blowing against the brake using the temperature and pressure of the housing space. As a result, for example, it is possible to control the main flow rate such that the air or the like blowing against the brake is at a desired flow velocity, and it is therefore possible to correctly evaluate the brake dust amount and the like.

In order to automate the setting of the main flow rate, it is preferable that the flow rate control mechanism control the main flow rate on the basis of at least one of the temperature or pressure of the housing space in which the brake is housed.

In order to make the flow velocity of the air blowing against the brake constant, it is preferable that the brake dust measurement device include a flow velocity calculator that calculates a flow velocity of a gas blowing against the brake on the basis of at least one of the temperature or pressure of the housing space in which the brake is housed, and it is preferable that the flow rate control mechanism control the main flow rate on the basis of a calculated flow velocity calculated by the flow velocity calculator.

The brake dust measurement device preferably includes a main flow meter provided on the downstream side from the sampling point in the main flow path.

This aspect makes it possible to reduce contamination of the main flow meter due to the brake dust as compared with the case where the main flow meter is provided on the upstream side from the sampling point, and there is no concern that a measurement result is influenced by brake dust adhered to the main flow meter.

For example, in order to make it possible to perform a test that simulates actual traveling, it is preferable that the flow rate control mechanism control the main flow rate on the basis of vehicle speed data representing a vehicle speed.

An aspect can be cited as a specific aspect for controlling the main flow rate and the sampling flow rate, in which aspect the flow rate control mechanism includes: a main flow rate adjustment unit that is provided on the main flow path and adjusts a flow rate of the sample gas to be drawn into the main flow path; a sampling flow rate adjustment unit that is provided on the sampling flow path and adjusts a flow rate of the sample gas to be drawn into the sampling flow path; and a flow rate controller that controls one or both of the main flow rate adjustment unit and the sampling flow rate adjustment unit to control the sampling flow rate that is a flow rate in the sampling flow path such that the sampling flow rate coincides with a flow rate proportional to the main flow rate that is a flow rate in the main flow path.

In order to make it possible to evaluate a brake dust amount, the brake dust measurement device preferably includes a brake dust amount calculator that calculates a brake dust amount in a single test or a brake dust amount per predetermined distance.

In order to make it possible to easily measure the brake dust amount, the brake dust measurement device preferably includes a collection unit that is provided in the sampling flow path and collects brake dust contained in the collected sample gas.

A downstream-side end mechanism of the sampling flow path is preferably configured to be connected, in the main flow path, between the sampling point and the main flow meter such that the sample gas collected into the sampling flow path is returned to the main flow path.

This configuration makes it possible to measure, as the main flow rate, the flow rate of the sample gas after the collected sample gas is returned to the main flow path; therefore, the sampling flow rate can be a flow rate proportional to the main flow rate more accurately.

Furthermore, as another aspect to make the sampling flow rate more accurately proportional to the main flow rate, an aspect can be cited, in which aspect the brake dust measurement device further includes a sampling flow meter provided in the sampling flow path, wherein the flow rate control mechanism corrects the main flow rate measured by the main flow meter using a sampling flow rate measured by the sampling flow meter.

As a specific configuration for controlling the sampling flow rate, a configuration can be cited, in which configuration the brake dust measurement device includes a sampling flow meter and a sampling pump provided in the sampling flow path.

More specifically, a configuration can be cited as an example, in which configuration the brake dust measurement device includes a brake dynamometer on which the brake is set.

Furthermore, a brake dust measurement method according to the present invention is a brake dust measurement method that measures brake dust generated from a brake, the brake dust measurement method including: causing a sample gas containing the brake dust to flow through a main flow path; collecting a part of the sample gas through a sampling flow path connected to a sampling point set in the main flow path; and controlling a sampling flow rate that is a flow rate in the sampling flow path such that the sampling flow rate coincides with a flow rate proportional to a main flow rate that is a flow rate in the main flow path.

Furthermore, a brake dust measurement program according to the present invention is used for a brake dust measurement device that measures brake dust generated from a brake, and the brake dust measurement device includes: a main flow path through which a sample gas containing the brake dust flows; and a sampling flow path that is connected to a sampling point set in the main flow path and collects a part of the sample gas. The brake dust measurement program causes a computer to perform a function as a flow rate controller, and the function includes controlling a sampling flow rate that is a flow rate in the sampling flow path such that the sampling flow rate coincides with a flow rate proportional to a main flow rate that is a flow rate in the main flow path.

The brake dust measurement method and brake dust measurement program as described above make it possible to achieve the same action and effect as the above-mentioned brake dust measurement device.

Advantageous Effects of Invention

With the present invention configured as described above, even when the main flow rate is fluctuated, the brake dust amount and the like can be accurately measured.

Figure 1:
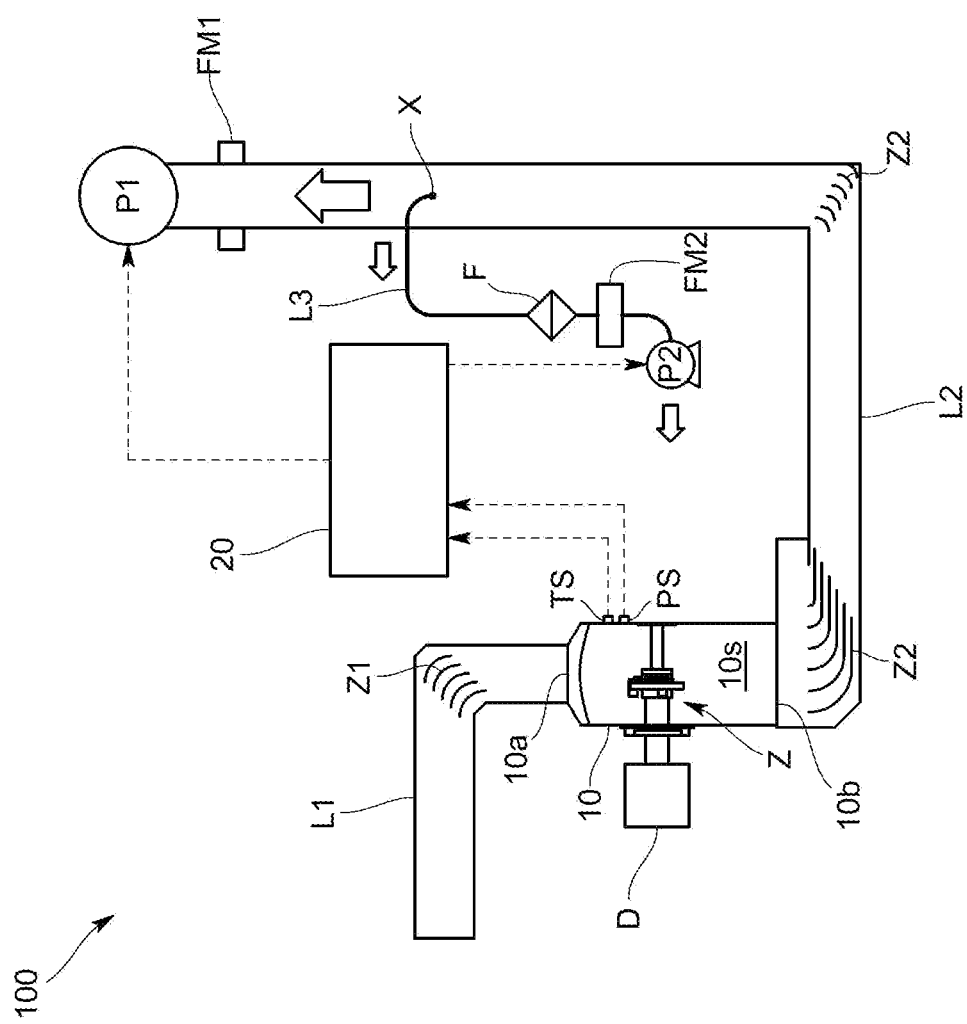
FIG. 1 is a schematic diagram illustrating an overall configuration of a brake dust measurement device according to an embodiment of the present invention.

REFERENCE SIGNS LIST 100 brake dust measurement device
101 flow rate control mechanism
B brake
D brake dynamometer
10 chamber
10S housing space
L1 supply flow path
L2 main flow path
L3 sampling flow path
B main pump (main flow rate adjustment unit)
P sampling pump (sampling flow rate adjustment unit)
F collection filter
control device
21 flow rate controller
22 flow velocity calculator
23 size information storage
24 brake dust amount calculator
FM1 main flow meter
FM2 sampling flow meter
X sampling point
TS temperature sensor
PS pressure sensor

DESCRIPTION OF EMBODIMENTS

Hereinafter, an embodiment of a brake dust measurement device according to the present invention will be described with reference to the drawings.

As illustrated in FIG. 1, a brake dust measurement device 100 according to the present embodiment is a device for testing performance of a brake Z by measuring, for example, an amount of brake dust generated by making the brake Z operate, and the brake dust measurement device 100 is configured to operate with the brake Z connected to a brake dynamometer D.

The brake dust measurement device 100 may be a device for testing performance of a brake Z of a test vehicle, which is a completed vehicle, while causing the test vehicle to travel on a chassis dynamometer.

Specifically, as illustrated in FIG. 1, the brake dust measurement device 100 includes a chamber 10 that houses a brake Z as a test piece connected to a brake dynamometer D, a supply flow path L1 that supplies gas to the brake Z operating in the chamber 10, a main flow path L2 through which brake dust generated from the brake Z flows together with the gas, and a sampling flow path L3 that collects a part of a sampling gas from the main flow path L2.

The chamber 10 has an internal space formed as a housing space 10s for housing the brake Z and is, for example, cylindrical.

The supply flow path L1 is connected to an inlet 10a provided in the chamber 10 and supplies, for example, air into the chamber 10 through the inlet 10a. As a result, the supplied air blows against the brake Z during operation. Note that the gas blown against the brake Z does not need to be air, and may be appropriately changed.

In this embodiment, as illustrated in FIG. 1, the inlet 10a is formed on the upper surface of the chamber 10, but the position of the inlet 10a is not limited thereto, and may be appropriately changed. As illustrated in FIG. 1, at bent parts of the supply flow path L1, for example, there may be provided one or a plurality of straightening vanes Z1 for straightening air.

The main flow path L2 is connected to an outlet 10b provided in the chamber 10, and the sample gas containing the brake dust led out from the outlet 10b flows through the main flow path L2. The sample gas in this embodiment is air containing brake dust.

In this embodiment, as illustrated in FIG. 1, the outlet 10b is disposed to face the inlet 10a and is specifically formed on the bottom surface of the chamber 10. By disposing the inlet 10a and the outlet 10b on the top and bottom of the chamber 10 as described above, the brake dust generated from the brake Z can be made to flow into the main flow path L2 without remaining in the chamber 10; therefore, a measurement error of the brake dust amount can be reduced for example. However, the position of the outlet 10b is not limited thereto, and may be appropriately changed. Furthermore, as illustrated in FIG. 1, at bent parts of the main flow path L2, for example, there may be provided with one or a plurality of straightening vanes Z2 for straightening sample gas.

On the downstream side of the main flow path L2 there is provided a main flow rate adjustment unit P1 for adjusting a flow rate of the sample gas drawn into the main flow path L2 from the chamber 10. The main flow rate adjustment unit P1 in this embodiment is a main pump provided for drawing the sample gas into the main flow path L2, but may be a blower or a mass flow controller provided separately from the main pump.

One end part of the sampling flow path L3 is connected to a previously set sampling point X in the main flow path L2, and the other end portion is provided with a sampling pump P2, so that the sampling pump P2 draws a part of the sample gas into the sampling flow path L3 from the main flow path L2.

The sampling flow path L3 is provided with a sampling flow rate adjustment unit P2 for adjusting the flow rate of the sample gas drawn from the main flow path L2 into the sampling flow path L3. The sampling flow rate adjustment unit P2 in this embodiment is the above-mentioned sampling pump P2 provided to draw the sample gas into the sampling flow path L3, but may be a blower or a mass flow controller provided separately from the sampling pump P2.

The sampling flow path L3 is provided with a collection filter F as a collection unit that collects the brake dust in the sample gas. However, the sampling flow path L3 may be provided with a sampling bag instead of or in addition to the collection filter F.

Note that the collection filter F is disposed on the upstream side from the above-mentioned sampling pump P2 so that it is possible to reduce contamination of the sampling pump P2 due to brake dust. However, the collection filter F may be disposed on the downstream side of the sampling pump P2.

Figure 2:
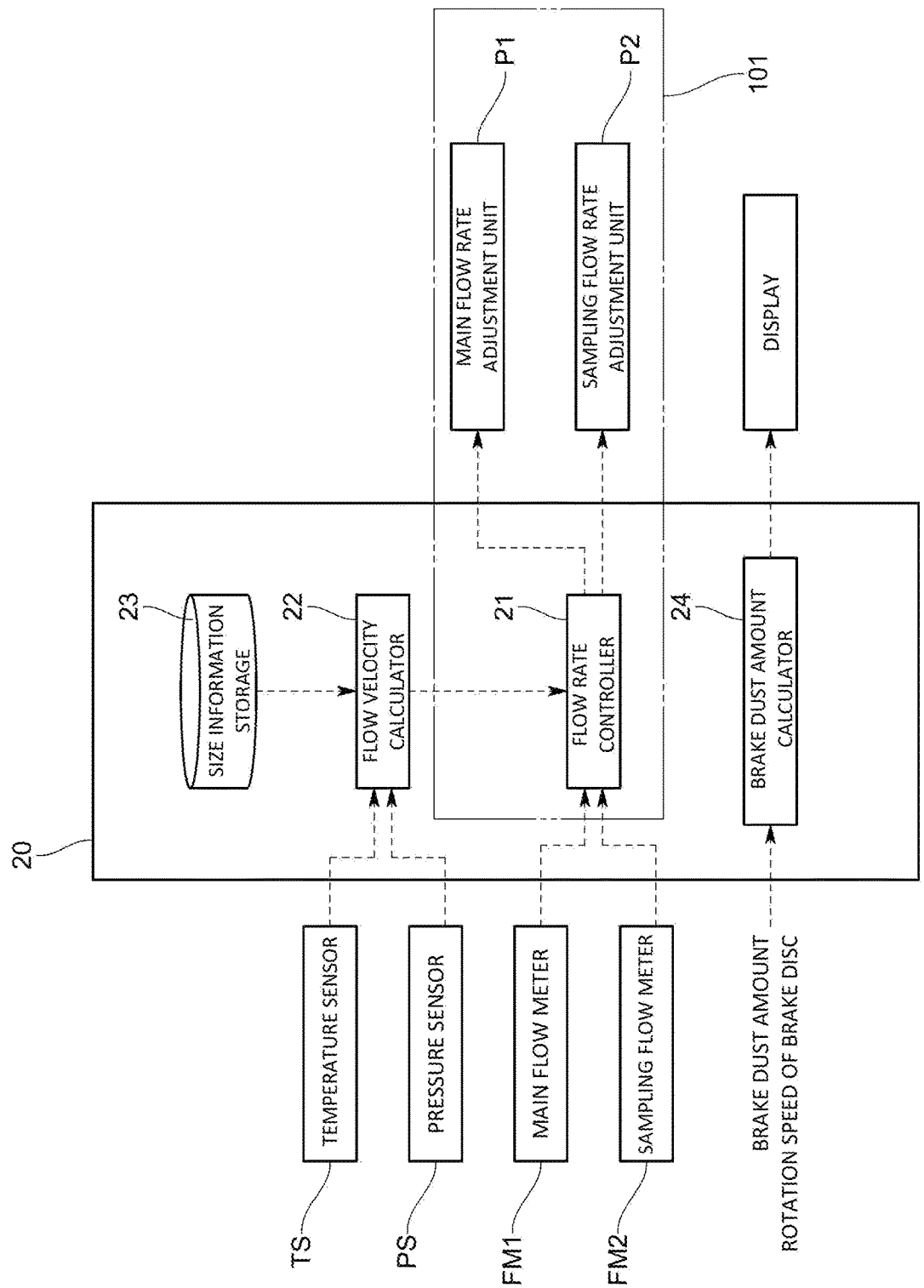
FIG. 2 is a functional block diagram illustrating functions of a control device of the embodiment.

In addition, as illustrated in FIGS. 1 and 2, the brake dust measurement device 100 of the present embodiment includes a flow rate control mechanism 101 that controls the sampling flow rate that is the flow rate in the sampling flow path L3 such that the sampling flow rate coincides with a flow rate proportional to the main flow rate that is the flow rate in the main flow path L2.

That is, in the brake dust measurement device 100 of the present embodiment, the flow rate in the main flow path L2 and the sampling flow rate that is the flow rate in the sampling flow path L3 are set by the flow rate control mechanism 101 such that the sampling flow rate coincides with a flow rate proportional to the main flow rate that is the flow rate in the main flow path L2.

Specifically, the flow rate control mechanism 101 includes, at least: the above-mentioned main flow rate adjustment unit P1 and sampling flow rate adjustment unit P2; a flow rate controller 21 that controls the main flow rate adjustment unit P1 and the sampling flow rate adjustment unit P2.

More specifically, the brake dust measurement device 100 of the present embodiment further includes: a main flow meter FM1 provided in the main flow path L2; and a sampling flow meter FM2 provided in the sampling flow path L3, and the flow rate controller 21 controls the sampling flow rate adjustment unit P2 such that the sampling flow rate measured by the sampling flow meter FM2 coincides with a flow rate proportional to the main flow rate measured by the main flow meter FM1.

In this embodiment, the main flow meter FM1 is provided on the downstream side of the sampling point X in the main flow path L2, and this arrangement is to reduce contamination due to brake dust. As a result, there is no concern about the influence on the measurement result due to adhesion of the brake dust to the main flow meter FM1. However, the main flow meter FM1 may be provided on the upstream side of the sampling point X in the main flow path L2. As an example of the main flow meter FM1, an ultrasonic flow meter or the like can be cited.

In this embodiment, the sampling flow meter FM2 is provided on the downstream side of the collection filter F in the sampling flow path L3, specifically, is provided between the collection filter F and the sampling pump P2, and this arrangement is to reduce contamination due to brake dust. However, the sampling flow meter FM2 may be provided on the upstream side of the collection filter F in the sampling flow path L3.

As illustrated in FIGS. 1 and 2, the flow rate controller 21 is a function provided in a control device 20 that is a general-purpose or dedicated computer including a CPU, a memory, and the like. That is, the control device 20 exerts at least a function as the flow rate controller 21 by causing the CPU and peripheral devices to cooperate according to a brake dust measurement program stored in a predetermined area of the memory.

Specifically, the flow rate controller 21 is configured to control sampling flow rate adjustment unit P2 (for example, a rotation speed of the sampling pump) such that the ratio of the sampling flow rate to the main flow rate coincides with a predetermined flow dividing ratio. Here, the main flow rate and the sampling flow rate are mass flow rates.

As illustrated in FIG. 2, the above-mentioned control device 20 may have a function as a flow velocity calculator 22 that calculates a flow velocity of the gas (here, air) blowing against the brake Z.

More specifically, as illustrated in FIG. 1, the chamber 10 of the present embodiment is provided with a temperature sensor TS that detects a temperature in the chamber 10. The temperature sensor TS is disposed to detect the temperature around (near) the brake Z, and is configured to output a detected temperature detected by the temperature sensor TS to the control device 20.

As illustrated in FIG. 1, the chamber 10 of the present embodiment is provided with a pressure sensor PS that detects a pressure in the chamber 10. The pressure sensor PS is disposed to detect the pressure around (near) the brake Z, and is configured to output a detected pressure detected by the pressure sensor PS to the control device 20.

Then, the flow velocity calculator 22 acquires the above-mentioned detected temperature and detected pressure and calculates the flow velocity of the gas (here, air) blowing against the brake Z on the basis of the detected temperature and the detected pressure.

More specifically, as illustrated in FIG. 2, the control device 20 of the present embodiment includes a size information storage 23 that stores size information of the chamber 10 such as a cross-sectional area of the chamber 10 or a diameter dimension for calculating the cross-sectional area, and the flow velocity calculator 22 is configured to calculate the flow velocity of the gas blowing against the brake Z on the basis of the detected temperature, the detected pressure, and the size information (for example, the cross-sectional area of the chamber 10).

In such a configuration, the flow rate controller 21 may be configured to control the main flow rate on the basis of at least one of the temperature or pressure of the housing space 10s in which the brake Z is housed.

Specifically, the flow rate controller 21 is configured to control the main flow rate using the calculated flow velocity calculated on the basis of the detected temperature and the detected pressure, and controls the main flow rate adjustment unit P1 (for example, a rotation speed of the main pump) such that the calculated flow velocity coincides with a predetermined constant flow velocity.

As illustrated in FIG. 2, the control device 20 may further include a function as a brake dust amount calculator 24 that calculates a brake dust amount.

The brake dust amount calculator 24 acquires the amount of the brake dust collected by the above-mentioned collection filter F, and calculates a total amount of the brake dust in a single test or a brake dust amount per predetermined distance. The amount of the brake dust collected by the collection filter F can be obtained, for example, by subtracting the weight of the collection filter F before collection from the weight of the collection filter F after collection.

As a more specific aspect of the brake dust amount calculator 24, for example, an aspect can be cited in which a total amount of brake dust is calculated by multiplying the amount of the collected brake dust by a flow dividing ratio between the main flow rate and the sampling flow rate.

As another aspect of the brake dust amount calculator 24, the following aspect can be cited, for example. A mass of the brake dust per unit travel distance is calculated by acquiring a rotation speed of a brake disk constituting the brake Z and calculating a travel distance from the rotation speed, and the mass is output to a display or the like.

Figure 3:
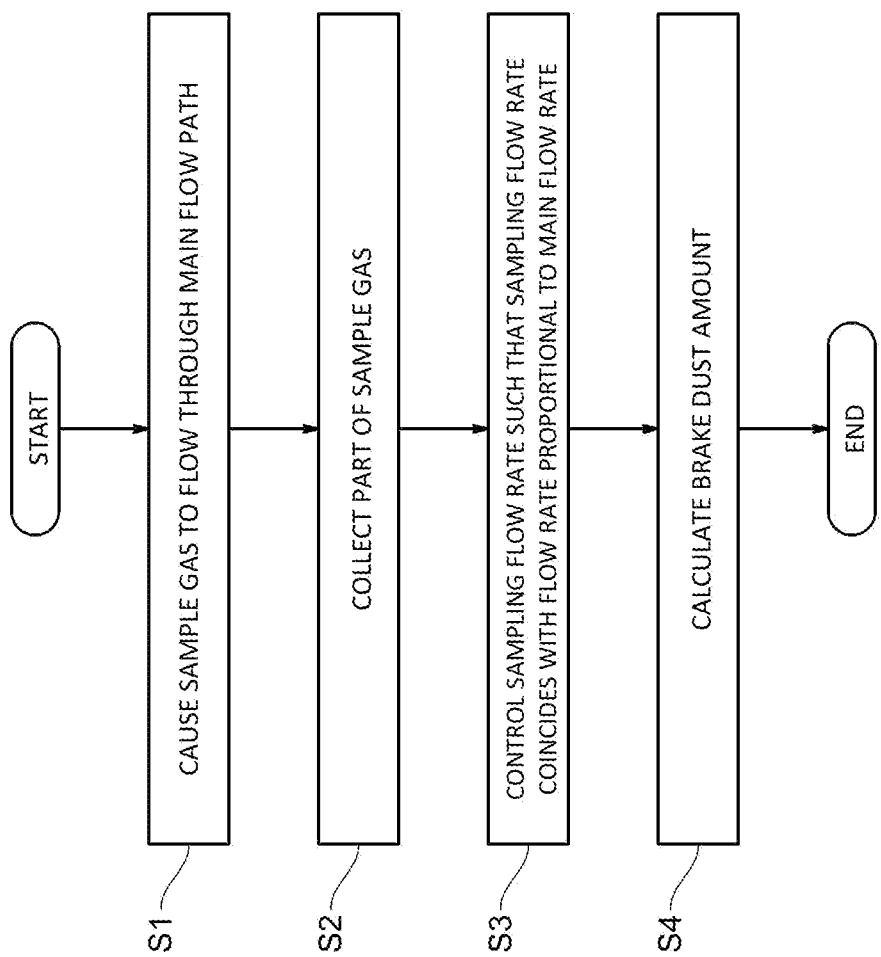
FIG. 3 is a flowchart illustrating a brake dust measurement method of the embodiment.

Next, a brake dust measurement method by the brake dust measurement device 100 of the present embodiment will be described with reference to the flowchart in FIG. 3.

First, when the brake Z is being operated in the chamber 10, air is supplied from the supply flow path L1 to the brake Z, and the main pump as the main flow rate adjustment unit P1 is operated, so that the sample gas containing the brake dust generated from the brake Z is flown through the main flow path L2 (step S1).

Then, a part of the sample gas flowing through the main flow path L2 is collected into the sampling flow path L3 (step S2). As a result, the brake dust contained in the sample gas is collected by the collection filter F.

At this time, the flow rate controller 21 feedback-controls, for example, the rotation speed of the sampling pump as the sampling flow rate adjustment unit P2 while comparing the main flow rate with the sampling flow rate such that the sampling flow rate coincides with a flow rate proportional to the main flow rate (step S3).

As mentioned above, in the present embodiment, the flow rate controller 21 controls the main flow rate by feedback-controlling, for example, the rotation speed of the main pump as the main flow rate adjustment unit P1 such that the calculated flow velocity calculated by the flow velocity calculator 22 coincides with a predetermined constant flow velocity.

After that, in the present embodiment, the brake dust amount calculator 24 calculates, for example, a total mass of the brake dust in a single test, a mass of the brake dust per unit travel distance, and the like, and outputs the calculated masses and the like to a display or the like (step S4).

The brake dust measurement device 100 configured as described above controls the sampling flow rate such that the sampling flow rate coincides with a flow rate proportional to the main flow rate; therefore, it is possible to accurately measure a brake dust amount and the like even when the main flow rate is fluctuated.

In addition, since the flow rate controller 21 controls the main flow rate such that the calculated flow velocity coincides with the predetermined constant flow velocity, the flow velocity of the air or the like blowing against the brake Z can be kept constant, and the brake dust amount and the like can be more correctly evaluated.

In addition, since the brake dust is collected by the collection filter F, the brake dust amount can be easily measured as compared with the case of using, for example, a sampling bag. Note that by guiding the sampling gas to a gas analyzer after or before the sampling gas passes through the collection filter F, it is also possible to measure the gaseous component generated from the brake.

Note that the present invention is not limited to the above embodiment.

Figure 4:
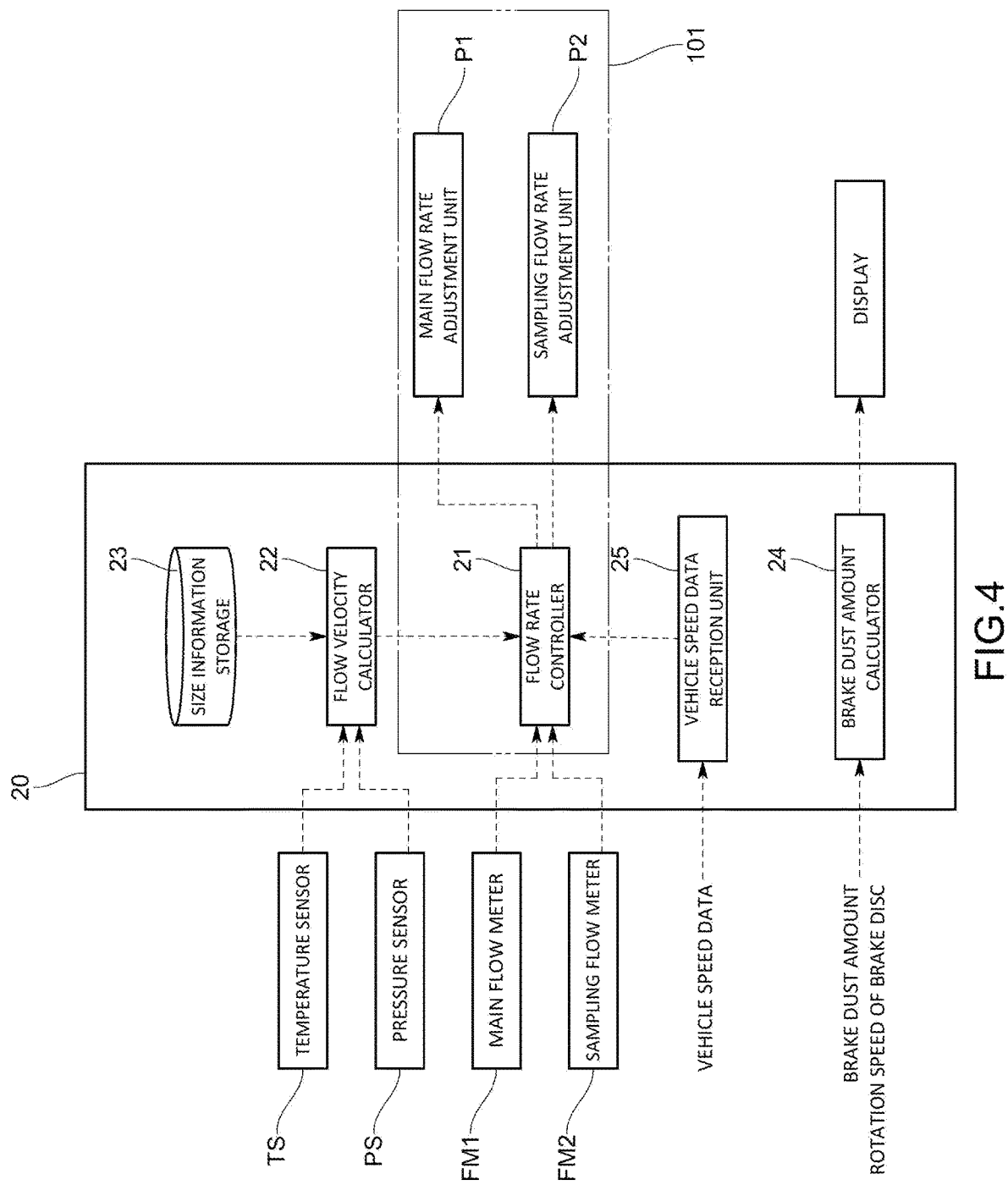
FIG. 4 is a functional block diagram illustrating functions of a control device of another embodiment.

For example, as illustrated in FIG. 4, the control device 20 may further include a vehicle speed data reception unit 25 that receives vehicle speed data representing a vehicle speed, and the flow rate controller 21 may be configured to control the main flow rate on the basis of the vehicle speed data received by the vehicle speed data reception unit 25. Examples of the vehicle speed data include time series data of a vehicle speed along a previously set traveling pattern and time series data of a vehicle speed obtained through actual traveling.

This configuration makes it possible to control the flow velocity of the air blown against the brake Z in accordance with, for example, the vehicle speed in actual traveling, and the test can be performed simulating actual traveling.

Figure 5:
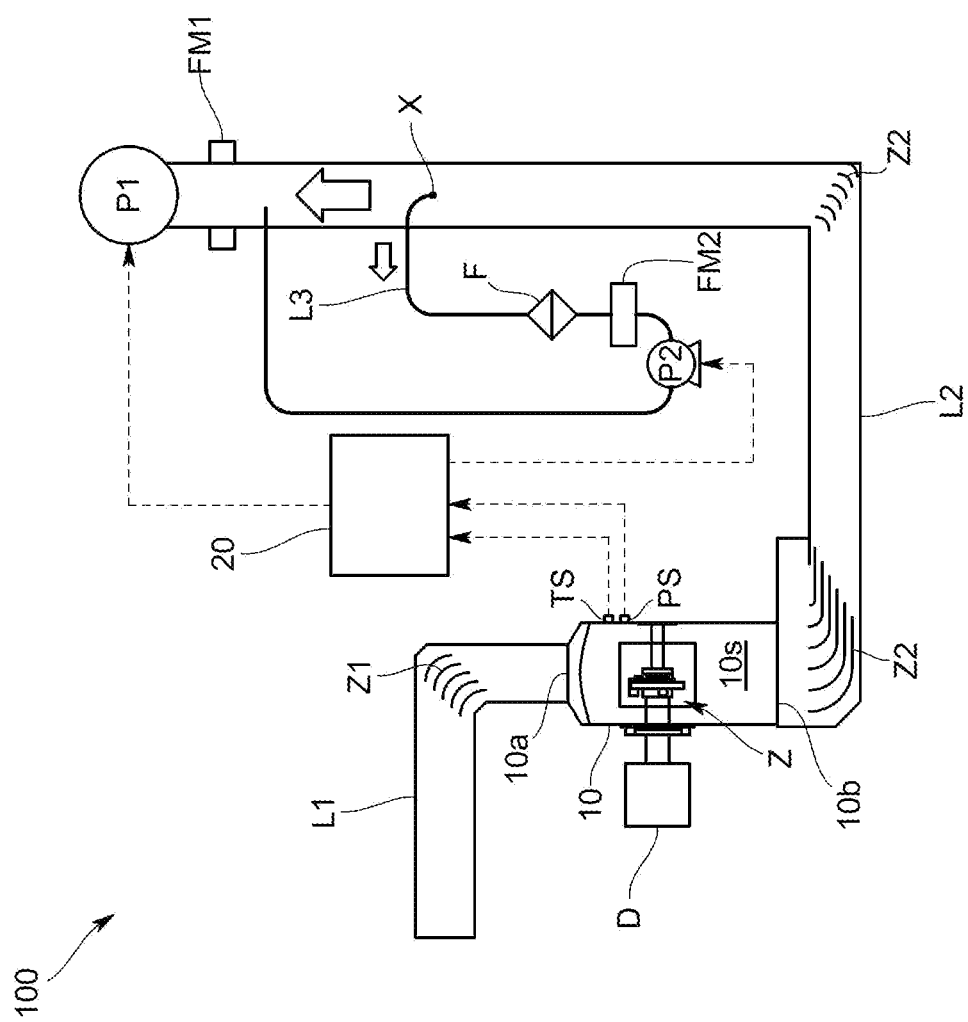
FIG. 5 is a schematic diagram illustrating an overall configuration of a brake dust measurement device of another embodiment.

The brake dust measurement device 100 of the present invention may be configured as follows, as illustrated in FIG. 5. The downstream-side end of the sampling flow path L3 is connected between the sampling point X in the main flow path L2 and the main flow meter FM1 so that the sample gas collected into the sampling flow path L3 is returned to the main flow path L2.

This configuration makes it possible to measure, as the main flow rate, the flow rate of the sample gas after the collected sample gas is returned to the main flow path L2; therefore, the sampling flow rate can be a flow rate proportional to the main flow rate more accurately.

As another aspect to make the sampling flow rate more accurately proportional to the main flow rate, an aspect can be cited in which the flow rate control mechanism 101 corrects the main flow rate measured by the main flow meter FM1, using a sampling flow rate measured by the sampling flow meter FM2.

Specifically, the flow rate controller 21 may be configured as follows: the flow rate controller 21 adds the sampling flow rate measured by the sampling flow meter FM2 to the main flow rate measured by the main flow meter FM1, and controls one or both of the main flow rate adjustment unit P1 and the sampling flow rate adjustment unit P2 on the basis of the flow rate to which the sampling flow rate has been added.

The size information storage 23 is not necessarily set in the memory of the control device 20, and may be set in an external memory, a cloud server, or the like.

Furthermore, the flow rate controller 21 of the above embodiment controls the main flow rate on the basis of the calculated flow velocity obtained by calculation, but the flow rate controller 21 may control the main flow rate on the basis of one or both of the detected temperature and the detected pressure without using the calculated flow velocity.

In addition, the main flow rate does not necessarily need to be controlled on the basis of the calculated flow velocity, the detected temperature, or the detected pressure. For example, the main flow rate may be set in advance using at least one of the calculated flow velocity, the detected temperature, or the detected pressure acquired before measurement, and does not have to be changed (controlled) at the time of subsequent measurement.

The flow rate controller 21 controls both the main flow rate adjustment unit P1 and the sampling flow rate adjustment unit P2 in the above embodiment; however, the flow rate controller 21 may control one of the main flow rate adjustment unit P1 and the sampling flow rate adjustment unit P2 such that the sampling flow rate coincides with a flow rate proportional to the main flow rate which is the flow rate in the main flow path.

In addition, the functions of the flow velocity calculator 22 and the brake dust amount calculator 24 are not necessarily provided in the same device as the flow rate controller 21, and may be provided in another device.

The brake dust measurement device 100 may include a function as a flow rate output unit that outputs the calculated flow velocity calculated by the flow velocity calculator 22 to a display or the like.

Furthermore, in the above embodiment, the amount of the brake dust collected by the collection filter F is calculated; however, instead of or in addition to the collection filter F, a diffusion changer sensor (DCS) that functions as a dust collection unit and an analysis unit may be installed in the sampling flow path L3 so that collection and analysis of the brake dust are performed, for example, simultaneously. Furthermore, instead of or in addition to the collection filter F, a Particle Number (PN) measuring device may be provided in the sampling flow path L3 so that the PN measuring device functions as a dust collection unit and an analysis unit.

Note that a concept including at least one of the collection filter F, a brake dust amount calculator, an exhaust gas analyzer, a diffusion charger sensor (DCS), or a PN measuring device may be referred to as a brake dust analysis unit.

The brake dust measurement device 100 may include a sampling bag for collecting the sample gas to measure various components contained in the collected sample gas. Examples of the component to be measured include components such as at least hydrocarbon derived from brake dust or components contained in exhaust gas.

Figure 6:
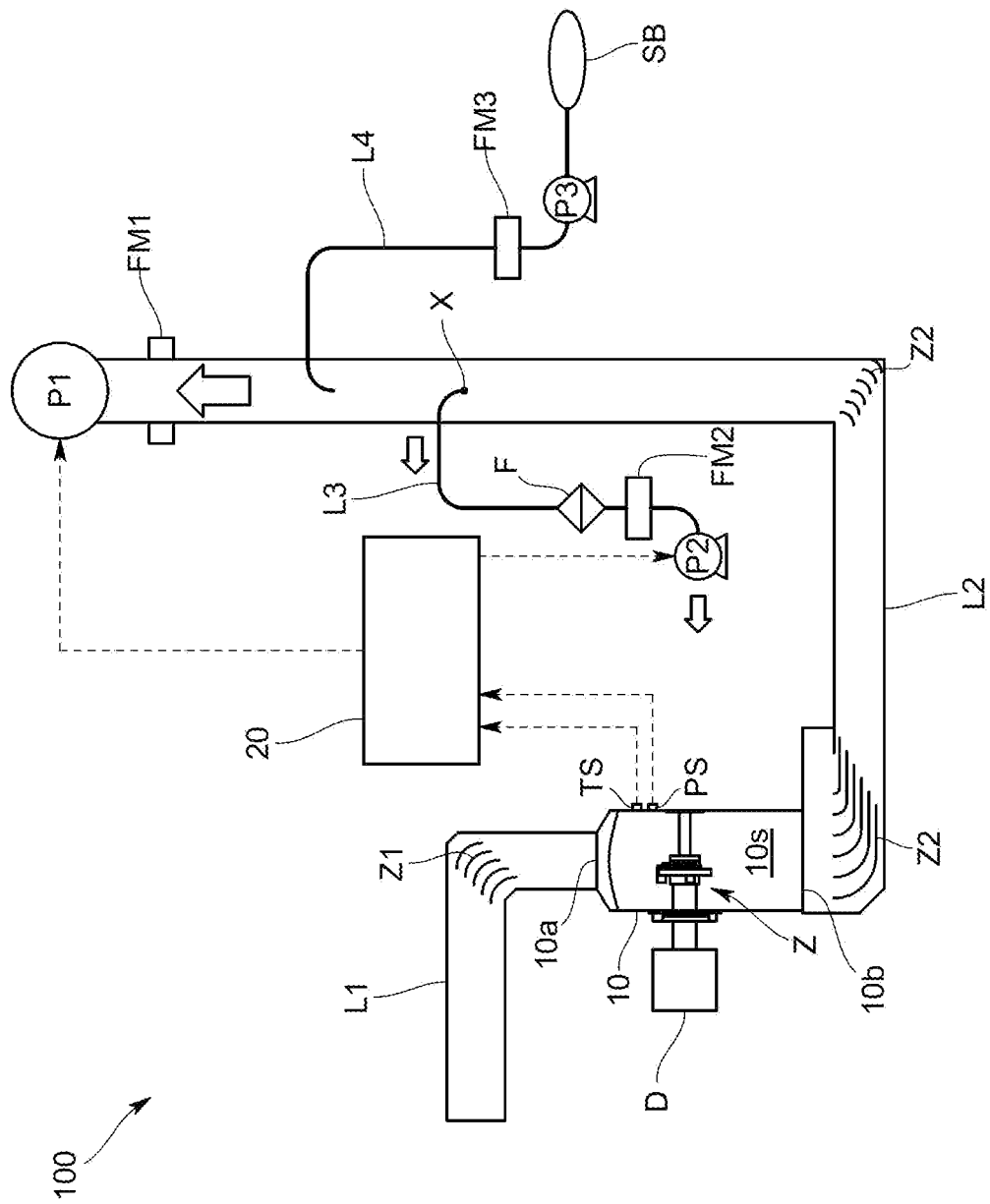
FIG. 6 is a schematic diagram illustrating an overall configuration of a brake dust measurement device of another embodiment.

In this case, a sampling bag SB may be provided on, for example, the downstream side of the sampling flow rate adjustment unit P2, or may be provided in a second sampling flow path L4 different from the sampling flow path L3 as illustrated in FIG. 6. In the configuration illustrated in FIG. 6, the second sampling flow path L4 may be provided with a sampling pump P3 as a second sampling flow rate adjustment unit and a second sampling flow meter FM3.

Note that the sampling point for the second sampling flow path L4 may be located upstream or downstream of the sampling point X for the sampling flow path L3.

In the configuration including the sampling bag SB as described above, the measurement of the sample gas collected in the sampling bag and the measurement of the brake dust may be performed simultaneously or separately.

Figure 7:
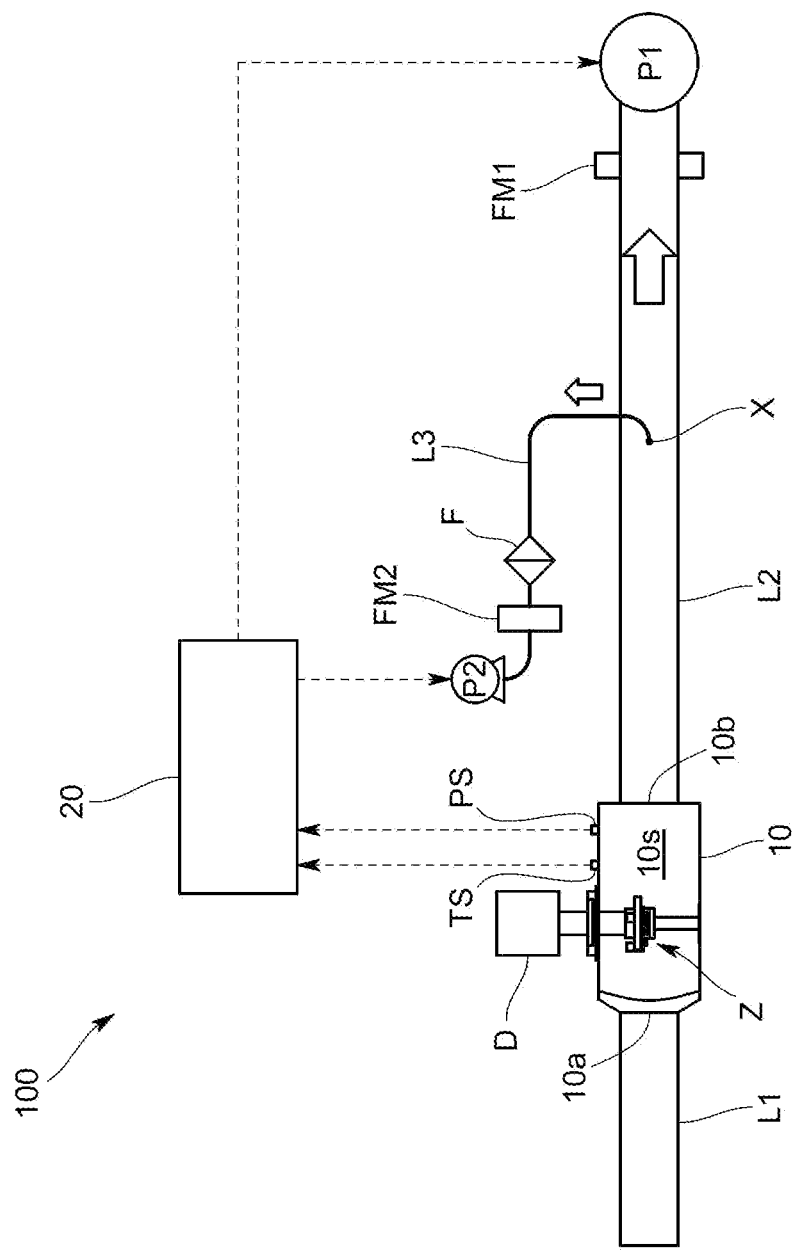
FIG. 7 is a schematic diagram illustrating an overall configuration of a brake dust measurement device of another embodiment.

Furthermore, the brake dust measurement device 100 according to the present invention may be configured such that air flows in the chamber 10 in the lateral direction (or substantially horizontal direction) as illustrated in FIG. 7, or although not illustrated, may be configured such that the air flows in the chamber 10 in an oblique direction inclined with respect to each of the lateral direction and the vertical direction.

As a specific embodiment, an aspect can be cited in which the inlet 10*a* and the outlet 10*b* for air are provided on the side circumferential surface of the chamber 10. The inlet 10*a* and the outlet 10*b* may be disposed to face each other, or may be disposed not to face each other.

In addition, the present invention is not limited to the above embodiments, and it goes without saying that various modifications can be made without departing from the gist of the present invention.

INDUSTRIAL APPLICABILITY

The present invention makes it possible to measure a brake dust amount and the like with higher accuracy than before.

The invention claimed is:
1. A brake dust measurement device that measures brake dust generated from a brake, the brake dust measurement device comprising:
 a main flow path through which a sample gas containing the brake dust flows;
 a sampling flow path that is connected to a sampling point set in the main flow path and collects a part of the sample gas;
 a main flow meter provided on a downstream side from the sampling point in the main flow path, wherein a downstream-side end of the sampling flow path is connected, in the main flow path, between the sampling point and the main flow meter such that the sample gas collected into the sampling flow path is returned to the main flow path; and a flow rate control mechanism that controls a sampling flow rate that is a flow rate in the sampling flow path such that the sampling flow rate coincides with a flow rate proportional to a main flow rate that is a flow rate in the main flow path.

2. The brake dust measurement device according to claim 1, wherein the main flow rate is set using at least one of a temperature or pressure of a housing space in which the brake is housed.

3. The brake dust measurement device according to claim 2, wherein the flow rate control mechanism controls the main flow rate, based on at least one of the temperature or pressure of the housing space.

4. The brake dust measurement device according to claim 3, further comprising a flow velocity calculator that calculates a flow velocity of a gas blowing against the brake based on at least one of the temperature or pressure of the housing space in which the brake is housed, wherein the flow rate control mechanism controls the main flow rate, based on a calculated flow velocity calculated by the flow velocity calculator.

5. The brake dust measurement device according to claim 1, wherein the flow rate control mechanism controls the main flow rate based on vehicle speed data representing a vehicle speed.

6. The brake dust measurement device according to claim 1, wherein the flow rate control mechanism includes:
a main flow rate adjustment unit that is provided on the main flow path and adjusts a flow rate of the sample gas to be drawn into the main flow path;
a sampling flow rate adjustment unit that is provided on the sampling flow path and adjusts a flow rate of the sample gas to be drawn into the sampling flow path; and
a flow rate controller that controls one or both of the main flow rate adjustment unit and the sampling flow rate adjustment unit to control the sampling flow rate that is a flow rate in the sampling flow path such that the sampling flow rate coincides with a flow rate proportional to the main flow rate that is a flow rate in the main flow path.

7. The brake dust measurement device according to claim 1, further comprising a brake dust amount calculator that calculates a brake dust amount in a single test or a brake dust amount per predetermined distance.

8. The brake dust measurement device according to claim 1, further comprising a collection unit that is provided in the sampling flow path and collects brake dust contained in the collected sample gas.

9. The brake dust measurement device according to claim 1, further comprising a sampling flow meter provided in the sampling flow path, wherein the flow rate control mechanism corrects the main flow rate measured by the main flow meter using a sampling flow rate measured by the sampling flow meter.

10. The brake dust measurement device according to claim 1, further comprising a brake dynamometer on which the brake is set.

11. A brake dust measurement method that measures brake dust generated from a brake, the brake dust measurement method comprising:
causing a sample gas containing the brake dust to flow through a main flow path;
collecting a part of the sample gas through a sampling flow path connected to a sampling point set in the main flow path, wherein a downstream-side end of the sampling flow path is connected, in the main flow path, between the sampling point and a main flow meter provided on a downstream side from the sampling point in the main flow path such that the sample gas collected into the sampling flow path is returned to the main flow path; and
controlling a sampling flow rate that is a flow rate in the sampling flow path such that the sampling flow rate coincides with a flow rate proportional to a main flow rate that is a flow rate in the main flow path.

12. A brake dust measurement device that measures brake dust generated from a brake, the brake dust measurement device comprising:
a main flow path through which a sample gas containing the brake dust flows;
a sampling flow path that is connected to a sampling point set in the main flow path and collects a part of the sample gas; and
a flow rate control mechanism that controls
a sampling flow rate that is a flow rate in the sampling flow path such that the sampling flow rate coincides with a flow rate proportional to a main flow rate that is a flow rate in the main flow path, and
the main flow rate based on vehicle speed data representing a vehicle speed.

* * * * *